United States Patent Office 2,966,403
Patented Dec. 27, 1960

2,966,403

SOLID PROPELLANT COMPOSITIONS AND PROCESSES FOR MAKING SAME

Lester L. Weil, Alexandria, Va., assignor to Atlantic Research Corporation, Alexandria, Va., a corporation of Virginia No Drawing. Filed Sept. 6, 1950, Ser. No. 183,457

20 Claims. (Cl. 52—.5)

This invention relates to new compositions of matter for use as solid propellants and to processes for making same. More specifically, it relates to solid propellants of the type which comprise a fuel and an insoluble oxidizing agent and which may readily be molded into grains of substantially any desired size or shape by extrusion or casting.

Solid, composite type propellants are well known, but hitherto they have been characterized by various undesirable properties. For example, asphalt in admixture with an oxidizing agent such as potassium perchlorate has been used, but such compositions possess low impulse and are subject to cold flow so that after a period of storage the grains become distorted.

More satisfactory solid propellants containing a synthetic resin as both fuel and binding agent have been made by incorporating an oxidizing agent into a liquid monomer or into a low molecular weight polymer which is still in a liquid or syrupy state. The resulting mixtures are molded and then polymerized and set by the application of heat. Generally speaking, the resins employed have been thermosetting such as phenol-formaldehyde, urea-aldehyde and alkyd resins, although styrene and acrylate resins have also been used.

Although such propellants provide good impulse and are not subject to distortion due to cold flow, they possess certain serious disadvantages. The grains are hard, brittle and substantially inelastic so that under low temperature conditions they tend to crack or fracture when subjected to severe shock or stress in the combustion chamber as, for example, under igniter impact. These cracks or fractures increase the burning area of the charge and the resulting increased gas pressure is frequently sufficient to cause an explosion. The tendency to fracture is particularly marked in the case of large grains.

The process employed in making the solid propellant compositions is also attended by serious difficulties. Polymerization of the resin is accomplished in the presence of the oxidizer. Since the polymerization reactions are exothermic, the temperature may build up to the point of auto-ignition and explosion. As a result polymerization or curing must be maintained at an exceedingly slow rate so that total curing time is frequently as long as nine days for moderate size grains. Large grains require proportionally longer curing periods.

It is also difficult to insure a uniform product both because of the shrinkage which occurs during polymerization (curing), and because the presence of the oxidizer and even traces of impurities which are likely to be introduced with the oxidizer, influence, frequently adversely, the polymerization or curing reactions so that the resulting propellant grains vary markedly in properties. It is, therefore, difficult to reproduce grains of uniform characteristics. In the case of large grains, the lack of uniformity is frequently manifested within the grain so that the larger the grain the greater the tendency to fracture.

The object of this invention is to provide solid propellants of uniform, reproducible and easily controlled characteristics which are rubbery in character and not subject to cracking or fracturing under very severe stresses or shocks, even at very low temperatures.

Still another object is to provide solid propellants which may be made in substantially any desired shape or size by casting without pressure or by extrusion with relatively little pressure.

Still another object is to provide solid propellants comprising insoluble oxidizer intimately dispersed in a solid, elastic gel obtained by dissolving polyvinyl chloride resin in an organic plasticizer, curing of which may be accomplished by heating for a matter of minutes, does not involve chemical reaction and is not affected by the presence of the oxidizer or extraneous impurities.

Another object is to provide processes for making the new solid propellants of my invention.

Other objects and advantages will appear more particularly hereinafter, from the following description.

In general, the solid propellants of my invention are prepared by incorporating a finely divided, insoluble oxidizer into a liquid dispersion or suspension of finely divided polyvinyl chloride or a copolymer comprising a major portion of polyvinyl chloride and a minor portion of another polymer such as polyvinyl acetate or vinylidene chloride, in an organic plasticizer, molding the still fluid mixture into grains of the desired size and shape by extrusion or by pouring into a mold and converting the modified fluid suspension into a solid gel by heating to the fusion temperature, namely, the temperature at which the resin rapidly dissolves in the plasticizer. The resin-plasticizer solution sets into a rubbery, homogeneous gel containing the insoluble oxidizer, which does not dissolve in the resin-plasticizer mixture, intimately and uniformly dispersed throughout.

To be suitable for my purpose the plasticizer, which is a high boiling solvent, should at ordinary temperatures dissolve the resin at an exceedingly low rate and form a suspension with the solid, finely divided resin which retains a high degree of fluidity. The resin-plasticizer mixture should have sufficiently low viscosity to permit the incorporation of as much as three or more times its weight of oxidizer without complete loss of fluidity so that the resulting composition may be extruded at relatively low pressures or poured into casting molds.

The choice of plasticizer may, of course, vary with particular conditions, as for example, the amount of resin and oxidizer to be incorporated. A particular plasticizer which may form too viscous a suspension with a given quantity of resin at ordinary temperatures may be perfectly satisfactory for use with a somewhat smaller amount of the resin. Mixtures of plasticizers may also be employed advantageously. For example, a plasticizer which forms suspensions of the desired low viscosity with the requisite amount of resin but somewhat weak solid gels, may be used in conjunction with a plasticizer which forms suspensions of somewhat too high viscosity and gels of superior tensile strength and flexibility. Examples of organic plasticizers which I have found suitable for my purpose include sebacates such as dibutyl sebacate and dioctyl sebacate, phthalates such as dioctyl phthalate, dibutyl phthalate, and di-(methoxyethyl) phthalate, adipates such as dioctyl adipate and di-(3,5,5-trimethylhexyl) adipate, glycol esters of higher fatty acids and the like. I have found that dioctyl sebacate, dibutyl sebacate and dioctyl phthalate are especially satisfactory. Plasticizers containing available oxygen in the form, for example of nitro or nitrate groups, such as diethylene glycol dinitrate, are also advantageous but preferably should be used in admixture with an inert plasticizer.

The amount of resin incorporated into the propellant mixture should be sufficient to provide a strong, flexible solid of high tensile strength. However, it should not be added in such large proportions as to make the suspension too viscous to permit the incorporation of the requisite amount of oxidizer. In general, I have found a ratio of approximately 1 part of resin to 1 part of plasticizer by weight to give excellent results. However, more or less of the resin may be incorporated, depending upon the specific plasticizer used. However, the ratio of resin to plasticizer should not in any case be less than about 2 parts of resin to about 3 parts of plasticizer. With lower proportions of resin, the physical properties of the resulting cured composition, as for example tensile strength and tendency to cold flow, are such as to make it unsuitable for use as a solid propellant.

Excessive rise in temperature during mixing should be avoided either by cooling the mixer or regulating the rate of mixing in order to prevent thickening. In general, it is advisable to avoid temperatures above about 30° C.

A stabilizer for the polyvinyl chloride, such as barium ricinoleate, should also be incorporated with the resin. This is a conventional procedure in cases where the polymer is to be subjected to heat. The stabilizer serves to absorb any hydrogen chloride liberated by the resin during heating, which would otherwise cause partial decomposition of the plastic. About 0.5 to 1% of the stabilizer is generally sufficient.

If desired, the resin-plasticizer-oxidizer fluid mix may be prepared by combining all of the components in a suitable mixing device and then agitating to obtain a uniform dispersion so long as a suitable ratio of resin to plasticizer is maintained. In other words, the resin-plasticizer ratio must be such as to provide a suspension of sufficient fluidity to permit inclusion of the oxidizer while still retaining substantial fluidity.

Both the resin and the organic plasticizer serve as the fuel with the gelatinized resin also serving as bonding agent. The amount of oxidizer incorporated may be varied depending upon the desired properties of the uncured propellant mix and of the final product. For example, a lower percentage of oxidizer might be desirable in certain cases, even at the expense of reduced specific impulse, in order to obtain a lower viscosity propellant mix, to improve the physical properties of the final product or to reduce the flame temperature of the combustion products. For optimum utilization of the gas-generating potentialities and for reasons of economy and reduction in weight load, it is, of course, desirable, though not essential from a performance standpoint, for the oxidizer to be incorporated in an amount as close as possible to that theoretically required to accomplish substantially complete oxidation of the fuel to its ultimate oxidation products, namely carbon dioxide and water. With proper formulation of a resin-plasticizer suspension of relatively low viscosity, I have found that up to about 90% of the theoretical amount of oxidizer, namely up to about 80% by weight which is sufficient to oxidize the fuel substantially completely and to accomplish theoretically up to about 90% oxidation to ultimate oxidation products, may be readily incorporated to form a mixture which, though viscous, is sufficiently fluid to be extruded through dies with relatively little pressure, or to be poured into molds, without sacrificing the desired physical properties either of the uncured mix or cured propellant composition. In general, about three parts by weight of oxidizer to about one part by weight of the resin-plasticizer mix gives excellent results both with respect to physical properties and impulse. The use of a plasticizer containing some available oxygen in the form, for example, of nitro or nitrate groups permits an even closer approach to theoretical oxygen balance. Any suitable, finely divided oxidizer may be employed, such as ammonium, sodium and potassium perchlorates, sodium nitrate, ammonium nitrate, and the like. Organic oxidizers, such as hexanitroethane, mannitol hexanitrate, and the like, may also be used if satisfactorily desensitized. For reasons of stability the inorganic oxidizers are preferable.

Finely divided polyvinyl chloride is readily obtainable commercially, as for example, Geon 121 and Geon 100X26S. Copolymers of polyvinyl chloride, as for example, copolymers with polyvinyl acetate, may also be used but only if the chloride is present in amounts of about 90% or more. Smaller proportions of polyvinyl chloride result before fusion in suspensions which are too highly viscous to permit incorporation of appreciable amounts of oxidizer, and after fusion, in solid compositions which are too soft and of insufficient tensile strength.

After the propellant grains have been molded by extrusion through a die or by casting, they are heated to the fusion temperature of about 160° to 175° C., at which point the resin rapidly and substantially completely dissolves in the plasticizer, heating is terminated and the grain permitted to cool. The fusion or curing temperature is well below the autoignition temperature of the propellant composition. Furthermore, the solution of the resin in the plasticizer which occurs at the fusion temperature is not exothermic. There is consequently no danger of explosion during the processing of the propellant.

Any suitable method of heating the grains to the fusion temperature may be employed. For example, the extrusion die may be surrounded by a heating means and the rate of passage of the material through the die controlled so that fusion is complete at the die exit. Curing by means of dielectric heaters which are capable of heating a non-conducting mass uniformly, is a particularly advantageous method. The heating time, of course, varies with the particular heating method used and the size of the grains. In general, curing may be accomplished in a matter of minutes.

The presence of the oxidizer or of impurities in the uncured mixture in no way interferes with the curing or properties of the propellant, since the resin being introduced in completely polymerized form, there is no chemical reaction involved in the curing step. Furthermore, there is no shrinkage when the resin dissolves in the plasticizer at the fusion temperature. As a result, my new propellant grains are easily reproducible and uniform in characteristics, quality and size.

The cured resin-plasticizer-oxidizer dispersions set or gel into firm, elastic, solids of high tensile strength, which do not become brittle at temperatures as low as −50 to −60° F. The surface is smooth and without cracks or fissures. Because of their high elasticity, they do not fracture under the severe stresses encountered during ignition or combustion in the jet propulsion devices. They are highly stable, showing no deterioration with age or at any storage temperatures likely to be encountered.

My new propellants burn smoothly without smoke or residue at both high and low pressures and provide a high specific impulse. Experts in the art have hitherto avoided the use of halogenated resins such as polyvinyl chloride in propellants because of the high chlorine content, on the ground that it would have a low specific impulse due to the high molecular weight of the exhaust gases, specifically hydrogen chloride gas. However, I have found that the presence of chlorine in the resin is as advantageous as the presence of reduced oxygen which has been recognized as desirable for obtaining propellants of high specific impulse. The presence of chlorine in effect increases the proportion of oxygen available to oxidize the carbon monoxide formed into carbon dioxide, and thus favorably influences completion of the latter reaction. Since the heat evolved in the oxidation of carbon monoxide to carbon dioxide is considerably greater than that evolved in the oxidation of carbon to carbon monoxide, the increase in specific impulse due to greater energy release because of more complete combustion of carbon monoxide to carbon dioxide compensates for the increased density of the exhaust gases, due to the formation of hydrogen chloride.

The following examples are illustrative of my invention but, it will be understood, are in no way limiting:

EXAMPLE I 50 parts of polyvinyl chloride (Geon 121) and 2 parts of stabilizer, barium ricinoleate, were thoroughly dispersed in 50 parts of dibutyl sebacate. The resulting suspension was a fluid of relatively low viscosity. 306 parts of ammonium perchlorate were added to and thoroughly mixed with the liquid resin suspension. The resulting mixture, which though viscous retained fluidity, was drawn into a 6 mm. glass tube and cured by heating to 175° C. at which temperature solution of the resin in the plasticizer was complete and heating was terminated. The resulting grain was a firm, elastic, homogeneous solid having a smooth surface without cracks or fissures. It ignited easily and burned smoothly without smoke or residue at a rate of approximately 0.1 inch per second at atmospheric pressure and at 0.5 inch at a pressure of 2,000 lbs.

Table I sets out the composition and characteristics of various propellant grains made according to the process as described in Example I.

*Table I*

[Compositions* (percent by weight)]

| Polymer | Percent | Plasticizer | Percent | Ammonium Perchlorate, percent | Remarks |
|---|---|---|---|---|---|
| Geon 121 [1] | 12 | Dioctyl sebacate | 12 | 75 | Good tensile strength. |
| Do | 12 | Dioctyl phthalate | 12 | 75 | Do. |
| Do | 12 | Dibutyl sebacate | 12 | 75 | Good tensile strength. Very flexible. |
| Do | 12 | Dibutyl sebacate / Plasti izer SC [3] | 8 / 4 | 75 | Fair tensile strength. |
| Do | 14.8 | Hylene B [4] / Di-methoxyethyl phthalate | 5.8 / 5.9 | 73 | Good tensile strength. Very flexible. |
| Do | 19.5 | Hylene B / Di-methoxyethyl phthalate | 9.7 / 4.9 | 65.5 | Good tensile strength. |
| Do | 18.3 | Hylene B | 11.0 | 70.1 | Somewhat weak. |
| Do | 14.8 | do / Di-methoxyethyl phthalate | 5.9 / 5.9 | 73 | Good tensile strength. |
| Do | 17.6 | Dibutyl sebacate | 11.7 | 70.2 | Very good tensile strength. |
| Pliovic AO [2] | 18 | Hylene B | 18 | 63.5 | Good tensile strength. Somewhat soft. |

*0.5%–1.0% barium ricinoleate stabilizer included in all compositions.
[1] Polyvinyl chloride.
[2] Copolymer polyvinyl chloride at least 90% and polyvinyl acetate.
[3] Triethylene glycol ester of fatty acid having from 6 to 10 carbon atoms.
[4] Di-(3,5,5-tri-methyl-hexyl)adipate.

It will be noted that while Hylene B when used alone as a plasticizer provides a very fluid suspension of the desired low viscosity and permits ready incorporation of the large amounts of oxidizer, the resulting gel or solid grain is somewhat weak. However, when it is used in combination with di-methoxyethyl phthalate which, when used alone gives liquid suspensions of somewhat higher viscosities than is desirable but solid gels of good tensile strength, the resulting propellant grains are excellent.

I have disclosed a number of examples and embodiments which are illustrative of my invention. However, it will be obvious to those skilled in the art that my invention encompasses a considerable number of variations within the scope of my claims.

I claim:

1. A solid propellant composition essentially comprising solid, inorganic strong oxidizing salt dispersed in a solid, rubbery gel in which the oxidizer is insoluble, said gel comprising a homogeneous dispersion in organic plasticizer of a copolymer of polyvinyl acetate and at least 90% of polyvinyl chloride, the plasticizer being characterized by its ability to dissolve the resin at a very slow rate at ordinary temperatures and rapidly at elevated temperatures, said resin being in a minimum ratio of about two parts of resin to three parts of plasticizer, said resin and said plasticizer serving as fuel, the oxidizer being present in amount sufficient substantially completely to oxidize the fuel, said propellant being elastic, rubber-like and non-brittle.

2. A solid propellant composition essentially comprising, solid, inorganic strong oxidizing salt dispersed in a solid, rubbery gel in which the oxidizer is insoluble, said gel comprising a homogeneous dispersion of polyvinyl chloride resin in organic plasticizer selected from the group consisting of dioctyl sebacate, dibutyl sebacate and dioctyl phthalate, said resin being in a minimum ratio of about two parts of resin to three parts of plasticizer, said resin and said plasticizer serving as fuel, the oxidizer being present in amount sufficient substantially completely to oxidize the fuel, said propellant being elastic, rubber-like and non-brittle.

3. A solid propellant composition essentially comprising, ammonium perchlorate dispersed in a solid rubbery gel, said gel comprising a homogeneous dispersion of polyvinyl chloride resin in organic plasticizer, the plasticizer being characterized by its ability to dissolve the resin at a very slow rate at ordinary temperatures and rapidly at elevated temperatures, said resin and said plasticizer being present in proportions of approximately one to one, said resin and said plasticizer serving as fuel, the ammonium perchlorate being present in amount sufficient substantially completely to oxidize the fuel, said propellant being elastic, rubber-like and non-brittle.

4. A solid propellant composition essentially comprising approximately three parts by weight of ammonium perchlorate dispersed in approximately one part by weight of a solid rubbery gel, said gel comprising a homogeneous dispersion of polyvinyl chloride resin in organic plasticizer selected from the group consisting of dioctyl sebacate, dibutyl sebacate and dioctyl phthalate, said resin and said plasticizer being present in proportions of approximately one to one, said resin and said plasticizer serving as fuel, the ammonium perchlorate being present in amount sufficient substantially completely to oxidize the fuel, said propellant being elastic, rubber-like and non-brittle.

5. A process for making solid propellant compositions which are elastic, rubber-like and non-brittle, comprising, forming a fluid suspension by admixing, at a maximum temperature of about 30° C., finely divided polyvinyl chloride resin with organic plasticizer which dissolves said resin at a very slow rate at ordinary temperatures, said resin being a minimum ratio of about two parts of resin to three parts of plasticizer, admixing, substantially at ordinary temperatures, finely divided, solid, insoluble, inorganic, strong oxidizing salt with said fluid suspension, said oxidizer which is insoluble in the resin-plasticizer mixture, being incorporated in an amount which permits the resulting mixture to retain fluidity and which is sufficient substantially completely to oxidize the resin and the plasticizer, and then heating the resulting mixture to the temperature at which said resin rapidly and substantially completely dissolves in said plasticizer to form a solid, rubbery, elastic gel, said resin and said plasticizer serving as fuel in said propellant compositions.

6. A process for making solid propellant compositions which are elastic, rubber-like and non-brittle, comprising, forming a fluid suspension by admixing, at a maximum temperature of about 30° C., finely divided copolymer containing at least about 90% of polyvinyl chloride, organic plasticizer which dissolves said resin at a very slow rate at ordinary temperatures, said resin being in a minimum ratio of about two parts of resin to three parts of plasticizer, and finely divided, solid, insoluble strong oxidizing agent selected from the group consisting of inorganic oxidizing salt, hexanitroethane and mannitol hexanitrate, said oxidizer which is insoluble in the resin-plasticizer mixture, being incorporated in an amount which permits the resulting mixture to retain fluidity and which is sufficient substantially completely to oxidize the resin and the plasticizer, and then heating the resulting mixture to the temperature at which said resin rapidly and substantially completely dissolves in said plasticizer to form a solid, rubbery, elastic gel, said resin and said plasticizer serving as fuel in said propellant compositions.

7. A process for making solid propellant compositions which are elastic, rubber-like and non-brittle, comprising forming a fluid suspension by admixing, at a maximum temperature of about 30° C., finely divided copolymer of polyvinyl acetate and at least about 90% of polyvinyl chloride, organic plasticizer which dissolves said resin at a very slow rate at said ordinary temperatures, said resin being in a minimum ratio of about two parts of resin to three parts of plasticizer, and finely divided, solid, insoluble inorganic strong oxidizing salt, said oxidizer which is insoluble in the resin-plasticizer mixture, being incorporated in an amount which permits the resulting mixture to retain fluidity and which is sufficient substantially completely to oxidize the resin and the plasticizer, and then heating the resulting mixture to the temperature at which said resin rapidly and substantially completely dissolves in said plasticizer to form a solid, rubbery, elastic gel, said resin and said plasticizer serving as fuel in said propellant compositions.

8. A process for making solid propellant compositions which are elastic, rubber-like and non brittle, comprising forming a fluid suspension by admixing, at a maximum temperature of about 30° C., finely divided polyvinyl chloride resin with organic plasticizer selected from the group consisting of dioctyl sebacate, dibutyl sebacate and dioctyl phthalate, said resin being in a minimum ratio of about two parts of resin to three parts of plasticizer, admixing, substantially at ordinary temperatures, finely divided, solid, insoluble inorganic strong oxidizing salt with said fluid suspension, said oxidizer which is insoluble in the resin-plasticizer mixture, being incorporated in an amount which permits the resulting mixture to retain fluidity and which is sufficient substantially completely to oxidize the resin and the plasticizer, and then heating the resulting mixture to the temperature at which said resin rapidly and substantially completely dissolves in said plasticizer to form a solid, rubbery, elastic gel, said resin and said plasticizer serving as fuel in said propellant compositions.

9. A process for making solid propellant compositions which are elastic, rubber-like and non-brittle, comprising forming a fluid suspension by admixing, at a maximum temperature of about 30° C., finely divided polyvinyl chloride resin with organic plasticizer selected from the group consisting of dioctyl sebacate, dibutyl sebacate and dioctyl phthalate, said resin being in a minimum ratio of about two parts of resin to three parts of plasticizer, admixing, substantially at ordinary temperatures, finely divided, ammonium perchlorate with said fluid suspension, said oxidizer being incorporated in an amount which permits the resulting mixture to retain fluidity and which is sufficient substantially completely to oxidize the resin and the plasticizer, and then heating the resulting mixture to the temperature at which said resin rapidly and substantially completely dissolves in said plasticizer to form a solid, rubbery, elastic gel, said resin and said plasticizer serving as fuel in said propellant compositions.

10. A process for making solid propellant compositions which are elastic, rubber-like and non brittle comprising, forming a fluid suspension by admixing, at a maximum temperature of about 30° C., finely divided polyvinyl chloride resin with organic plasticizer which dissolves said resin at a very slow rate at ordinary temperatures, said resin and said plasticizer being in an approximate ratio of one to one, admixing substantially at ordinary temperatures approximately three parts by weight of finely divided, insoluble, inorganic strong oxidizing salt with which is insoluble in the resin-plasticizer mixture, approximately one part by weight of said fluid suspension, molding the resulting fluid mixture and then heating the molded mixture to the temperature at which said resin rapidly and substantially completely dissolves in said plasticizer to form a solid, rubbery, elastic gel, said resin and said plasticizer serving as fuel in said propellant compositions.

11. A process for making solid propellant compositions which are elastic, rubber-like and non brittle comprising, forming a fluid suspension by admixing, at a maximum temperature of about 30° C., finely divided polyvinyl chloride resin with organic plasticizer selected from the group consisting of dioctyl sebacate, dibutyl sebacate and dioctyl phthalate said resin and said plasticizer being in an approximate ratio of one to one, admixing at ordinary temperature, approximately three parts by weight of finely divided ammonium perchlorate with approximately one part by weight of said fluid suspension, molding the resulting fluid mixture and then heating the molded mixture to the temperature at which said resin rapidly and substantially completely dissolves in said plasticizer to form a solid, rubbery, elastic gel, said resin and said plasticizer serving as fuel in said propellant compositions.

12. A solid propellant composition essentially comprising a solid, insoluble, strong oxidizing agent selected from the group consisting of inorganic oxidizing salt, hexanitroethane and mannitol exhanitrate, dispersed in a solid, rubbery gel in which the oxidizer is insoluble, said gel comprising a homogeneous dispersion of polyvinyl chloride resin in organic plasticizer, the plasticizer being characterized by its ability to dissolve the resin at a very slow rate at ordinary temperatures and rapidly at elevated temperatures, said resin being in a minimum ratio of about two parts of resin to three parts of plasticizer, said resin and said plasticizer serving as fuel, the oxidizer being present in a major proportion by weight of said composition, said propellant composition being elastic, rubber-like and non-brittle.

13. A solid propellant composition essentially comprising solid, insoluble, inorganic, strong oxidizing salt dispersed in a solid rubbery gel in which the oxidizer is insoluble, said gel comprising a homogeneous dispersion of polyvinyl chloride resin in organic plasticizer, the plasticizer being characterized by its ability to dissolve the resin at a very slow rate at ordinary temperatures and rapidly at elevated temperatures, said resin being in a minimum ratio of about two parts of resin to three parts of plasticizer, said resin and said plasticizer serving as fuel, the oxidizer being present in a major proportion by weight of said composition, said propellant composition being elastic, rubber-like and non-brittle.

14. A solid propellant composition essentially comprising a solid, insoluble, strong oxidizing agent selected from the group consisting of inorganic oxidizing salt, hexanitroethane and mannitol hexanitrate, dispersed in a solid, rubbery gel in which the oxidizer is insoluble, said gel comprising a homogeneous dispersion in organic plasticizer of a copolymer containing at least about 90% of polyvinyl chloride, the plasticizer being characterized by its ability to dissolve the resin at a very slow rate at ordinary temperatures and rapidly at elevated temperatures, said resin being in a minimum ratio of about two parts of resin to three parts of plasticizer, said resin and said plasticizer serving as fuel, the oxidizer being present in a major proportion by weight of said composition, said propellant composition being elastic, rubber-like and non-brittle.

15. A solid propellant composition essentially comprising ammonium perchlorate dispersed in a solid rubbery gel, said gel comprising a homogeneous dispersion of polyvinyl chloride resin in organic plasticizer, the plasticizer being characterized by its ability to dissolve the resin at a very slow rate at ordinary temperatures and rapidly at elevated temperatures, said resin being in a minimum ratio of about two parts of resin to three parts of plasticizer, said resin and said plasticizer serving as fuel, the ammonium perchlorate being present in major proportion by weight of said composition, said propellant composition being elastic, rubber-like and non-brittle.

16. A process for making solid propellant compositions which are elastic, rubber-like and non-brittle, comprising forming a fluid suspension by admixing at a maximum temperature of about 30° C. finely divided polyvinyl chloride resin, finely divided, insoluble, strong oxidizing agent selected from the group consisting of solid inorganic oxidizing salt, hexanitroethane and mannitol hexanitrate, and organic plasticizer which dissolves the resin at a very slow rate at ordinary temperatures and rapidly at elevated temperatures, the resin being in a minimum ratio of about two parts of resin to about three parts of plasticizer, said oxidizer, which is insoluble in the resin-plasticizer mixture, being incorporated in an amount which permits the resulting mixture to retain fluidity and which comprises a major proportion by weight of said composition, and then heating the resulting mixture to the temperature at which said resin rapidly and substantially completely dissolves in the plasticizer to form a solid, rubbery, elastic gel, said resin and said plasticizer serving as fuel in said propellant composition.

17. A process for making solid propellant compositions which are elastic, rubber-like and non-brittle, comprising forming a fluid suspension by admixing, at a maximum temperature of about 30° C., finely divided polyvinyl chloride resin, finely divided solid, insoluble, inorganic, strong oxidizing salt and organic plasticizer which dissolves said resin at a very slow rate at ordinary temperatures, said resin being in a minimum ratio of about two parts of resin to about three parts of plasticizer, the oxidizer, which is insoluble in the resin-plasticizer mixture, being incorporated in an amount which permits the resulting mixture to retain fluidity and which comprises a major proportion by weight of said composition, and then heating the resulting mixture to the temperature at which said resin rapidly and substantially completely dissolves in said plasticizer to form a solid, rubbery elastic gel, said resin and said plasticizer serving as fuel in said propellant composition.

18. A process for making solid propellant compositions which are elastic, rubber-like and non-brittle, comprising forming a fluid suspension by admixing, at a maximum temperature of about 30° C., finely divided copolymer containing at least about 90% of polyvinyl chloride, finely divided solid, insoluble, inorganic, strong oxidizing salt and organic plasticizer which dissolves said resin at a very slow rate at ordinary temperatures, said resin being in a minimum ratio of about two parts of resin to about three parts of plasticizer, the oxidizer, which is insoluble in the resin-plasticizer mixture, being incorporated in an amount which permits the resulting mixture to retain fluidity and which comprises a major proportion by weight of said composition, and then heating the resulting mixture to the temperature at which said resin rapidly and substantially completely dissolves in said plasticizer to form a solid, rubbery elastic gel, said resin and said plasticizer serving as fuel in said propellant composition.

19. A solid propellant composition essentially comprising approximately 3 parts by weight of a solid, insoluble, strong oxidizing agent selected from the group consisting of inorganic oxidizing salt, hexanitroethane and mannitol hexanitrate, dispersed in approximately 1 part by weight of a solid, rubbery gel in which the oxidizer is insoluble, said gel comprising a homogeneous dispersion of polyvinyl chloride resin in organic plasticizer, the plasticizer being characterized by its ability to dissolve the resin at a very slow rate at ordinary temperatures and rapidly at elevated temperatures, said resin being in a minimum ratio of about two parts of resin to three parts of plasticizer, said resin and said plasticizer serving as fuel, said propellant composition being elastic, rubber-like and non-brittle.

20. A solid propellant composition essentially comprising approximately 3 parts by weight of solid, insoluble, inorganic, strong oxidizing salt dispersed in approximately 1 part by weight of a solid rubbery gel in which the oxidized is insoluble, said gel comprising a homogeneous dispersion of polyvinyl chloride resin in organic plasticizer, the plasticizer being characterized by its ability to dissolve the resin at a very slow rate at ordinary temperatures and rapidly at elevated temperatures, said resin being in a minimum ratio of about two parts of resin to three parts of plasticizer, said resin and said plasticizer serving as fuel, said propellant composition being elastic, rubber-like and non-brittle.

References Cited in the file of this patent

UNITED STATES PATENTS

| Number | Name | Date |
|---|---|---|
| 1,529,322 | Schapiro | Mar. 10, 1925 |
| 1,929,453 | Semon | Oct. 10, 1933 |
| 2,067,213 | Snelling | Jan. 12, 1937 |
| 2,115,896 | Wiezevich | May 3, 1938 |
| 2,117,591 | Alexander | May 17, 1938 |
| 2,157,997 | Brous | May 9, 1939 |
| 2,476,832 | Donia | July 19, 1949 |
| 2,479,470 | Carr | Aug. 16, 1949 |
| 2,514,185 | Eberly | July 4, 1950 |
| 2,673,193 | Kolvoort | Mar. 23, 1954 |

FOREIGN PATENTS

| Number | Country | Date |
|---|---|---|
| 580,409 | Great Britain | Sept. 6, 1946 |